United States Patent [19]
Schumacher et al.

[11] Patent Number: 5,840,144
[45] Date of Patent: Nov. 24, 1998

[54] PROCESS FOR APPLYING A COVERING MADE OF A NATURAL PRODUCT

[75] Inventors: Rolf Schumacher, Sindelfingen; Andreas Kellermann, Weil der stadt, both of Germany

[73] Assignee: Mercedes-Benz AG, Stuttgart, Germany

[21] Appl. No.: 692,406

[22] Filed: Aug. 5, 1996

[30] Foreign Application Priority Data

Aug. 4, 1995 [DE] Germany ............... 195 28 788.6

[51] Int. Cl.$^6$ ..................................... B62D 1/06
[52] U.S. Cl. ................. 156/267; 156/212; 74/492
[58] Field of Search .................. 156/212, 267; 74/492

[56] References Cited

U.S. PATENT DOCUMENTS

| | | | |
|---|---|---|---|
| 3,878,015 | 4/1975 | Johnston | 156/222 |
| 4,931,124 | 6/1990 | Baum | 156/245 |
| 5,565,263 | 10/1996 | Ohsumi et al. | 428/224 |

FOREIGN PATENT DOCUMENTS 40 39 138 C1  12/1990  Germany .

*Primary Examiner*—Francis J. Lorin
*Attorney, Agent, or Firm*—Evenson, McKeown, Edwards & Lenahan, P.L.L.C.

[57] ABSTRACT

A process for covering an object such as a steering wheel with a natural covering, preferably fine wood veneer, wherein the veneer is cut into strips, softened and molded. The thus molded veneer strip is first glued to one side of the object and then the ends are trimmed. Thereafter, a molded veneer strip is glued to the opposite side of the object, and the ends are trimmed.

21 Claims, 3 Drawing Sheets

PROCESS FOR APPLYING A COVERING MADE OF A NATURAL PRODUCT

BACKGROUND AND SUMMARY

The present invention relates to a process for applying a natural covering to an object having a plastic casing supported by a skeleton tube, such as a steering wheel for vehicles. The present invention also relates to a process for manufacturing a steering wheel for vehicles which has a covering made of a natural product on a plastic casing around a skeleton tube.

German Patent No. DE 40 39 138 discloses a steering wheel having a natural covering, as well as a process for manufacturing such a steering wheel. The natural product disclosed in DE 40 39 138 is root wood veneer. The manufacturing process involves removing the polyurethane foam covering the metal steering wheel rim core from the circumferential areas in which the wood veneer is to be applied. The root wood material is then applied to those freed circumferential areas. If the root wood is in the form of a veneer, it is first applied to plastic carrier half shells and then glued in the shape of these half shells onto the corresponding areas of the freed metal steering wheel rim core.

A goal of the present invention is to provide a better, particularly more efficient, manufacturing process.

According to the present invention, an object is entirely or partially covered with a natural covering. In a preferred embodiment, the object is a steering wheel wherein the steering wheel rim is entirely or partially covered with a covering made of wood or cork veneer with a varnish coating.

In preferred embodiments, the object is a steering wheel wherein the steering wheel rim is partially covered, such as on the top and bottom segments of the steering wheel when the steering wheel is facing straight forward, with a covering made of wood or cork veneer with a varnish coating. In between the top and bottom wood-veneered or cork-veneered segments, on either side of the steering wheel when the steering wheel is facing straight forward, in the area to which the hands are usually applied, are segments covered with a soft covering, preferably leather. A circumferential groove, which extends along the cross-sectional plane of the steering wheel rim, is arranged in the transition area between the wood- or cork-veneered segments and the soft covering segments, for receiving the end of the respective soft covering segments.

The process of the present invention comprises the steps of veneering the wood- or cork-veneered segments with a veneer by cutting strips corresponding to the wood- or cork-veneered segments out of a flat sheet of fine wood or cork veneer, the width of the strips being larger than half the cross-sectional circumference of the object to be covered, watering the veneer strips for at least one hour by watering them to soften them and make them pliable, and press-drying the softened veneer strips in a heatable molding tool having an upper and a lower die, which, except for the thickness of the veneer, correspond in a negative or mating manner, and molding the blanks into a dimensionally stable shaped veneer part in the form of a half shell, wherein the edge of the half shell, which projects out of the shape-determining engraving of the molding tool, forms a projection which is curled in an undefined manner.

In the case where the veneer is to be applied to a steering wheel rim, the process comprises the steps of cutting curved strips corresponding to the wood- or cork-veneered segments out of a flat sheet of fine wood or cork veneer, the width of the curved strips being larger than half the cross-sectional circumference of the steering wheel rim. In this case, after being softened, the veneer strips are press-dried in the form of a curved and groove-shaped half shell.

The veneering of the wood- or cork-veneered segments takes place in two stages, each stage having two steps, wherein in the first stage, a segment is finish-veneered first on one side of the object to be veneered and in the second stage, is finish-veneered on the opposite side. During the first step of each individual veneering stage, a shaped veneer part is glued with a bonding agent onto the segment to be covered, wherein the shaped veneer part is pressed with a molding tool against the object to be veneered during the setting time. In the second step of each individual veneering stage, the projecting shaped veneer parts, which are curled in an undefined manner, are trimmed by milling or grinding along an intersecting line extending tangentially with respect to the cross-section of the object to be veneered. After the two-sided veneering of the object, the veneer segments are ground to fit, polished, varnished and the surface is finished. Finally, the circumferential ends of the shaped veneer parts are trimmed with a fine end-milling cutter guided by a numerically controlled machine.

In the case of a steering wheel with veneer on the top and bottom, the veneering of the wood- or cork-veneered segments takes place by finish veneering first the top and bottom of one axial frontal side of the steering wheel rim and second the top and bottom of the axially opposite frontal side. During each individual veneering stage, the shaped veneer part is glued with a bonding agent onto the respective frontal sides of the steering wheel rim, wherein the shaped veneer part is axially pressed with a molding tool against the steering wheel rim during the setting time and then the projecting shaped veneer parts, which are curled in an undefined manner, are trimmed by milling or grinding along an intersecting line extending tangentially with respect to the cross-section of the steering wheel rim and aligned approximately axially with respect to the steering wheel rim. After the two-sided veneering of the steering wheel, the veneered segments are ground to fit, polished, varnished and the surface is finished. Finally, the circumferential ends of the shaped veneer parts are trimmed with a fine end-milling cutter guided by a numerically controlled machine.

The process of certain preferred embodiments of the present invention with respect to a steering wheel further comprises the steps of first encasing a no-spoke skeleton tube ring in the areas to be veneered with a plastic setting material corresponding to the desired steering wheel rim thickness minus the veneer thickness to be applied, veneering the encased segments, finishing the veneer, welding a spoke skeleton which is connected to an impact plate skeleton to the areas of the steering wheel rim that are not yet encased, encasing the areas of the steering wheel rim that are not yet encased with a rigid expanded plastic foam coating, wherein the thickness of the foam coating corresponds to the desired steering wheel rim thickness and spoke thickness minus the thickness of a soft covering to be applied, and covering the foam coating with a soft covering.

According to the process of the present invention, other parts of vehicles, such as, for example, shift lever grips, can also be veneered particularly with wood as the natural product.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
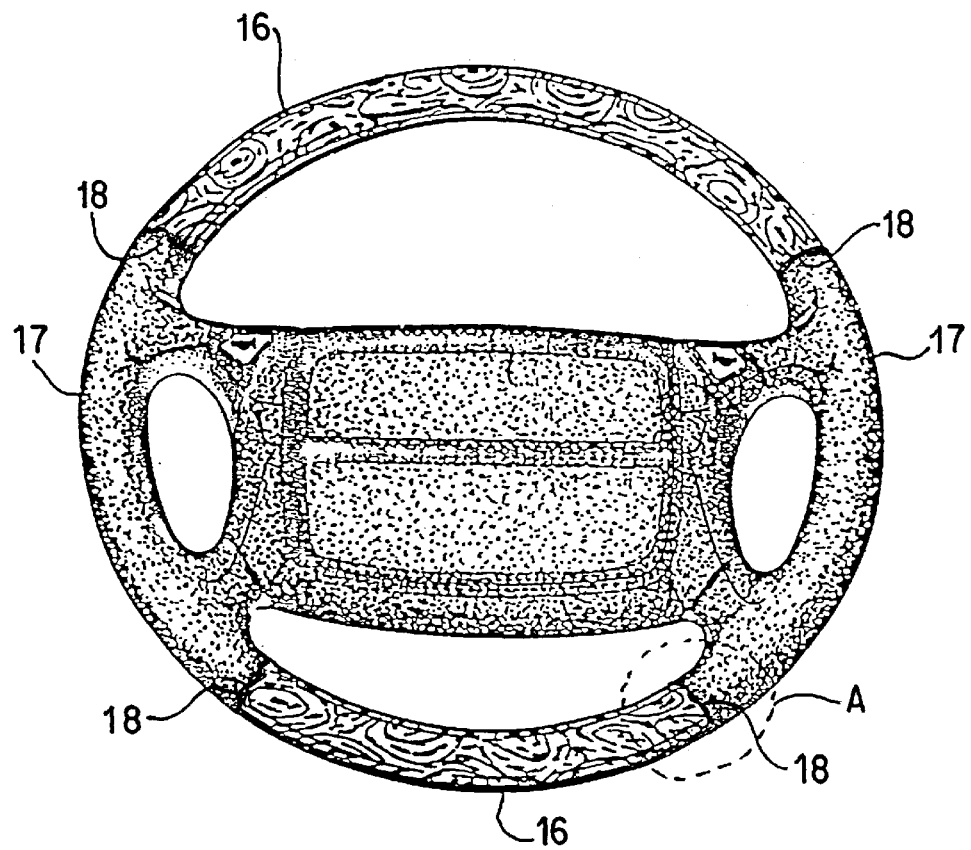
FIG. 1 is a planar view of a finished steering wheel with a veneer covering on the top and bottom sections and with a soft covering in the sections in between constructed utilizing a process according to preferred embodiments of the present invention.

FIG. 1 represents a finished steering wheel with a veneer covering 16 on the top and bottom sections and a soft covering 17 in the sections in between. A veneer/soft covering abutment junction 18 is found in the finished steering wheel.

Figure 2:
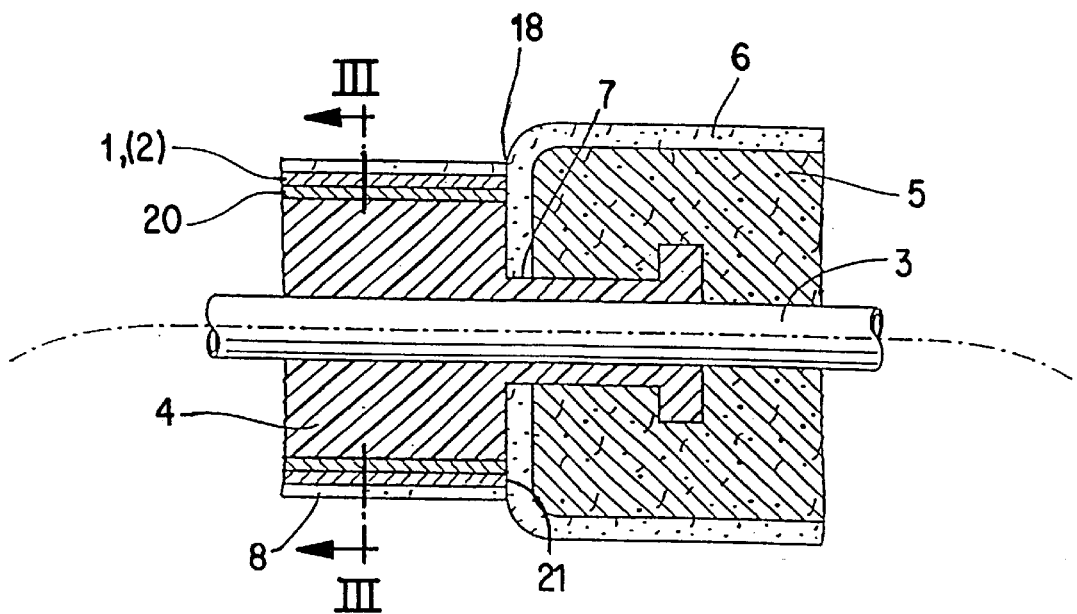
FIG. 2 is a cross-sectional view of a steering wheel rim in the plane of the steering wheel, showing section A schematically depicted in FIG. 1.

FIG. 2 is a cross-sectional view of a steering wheel rim in the plane of the steering wheel showing section A from FIG. 1 with the abutment between the wood-veneered and leather-covered circumferential area of the steering wheel rim.

Figure 3:
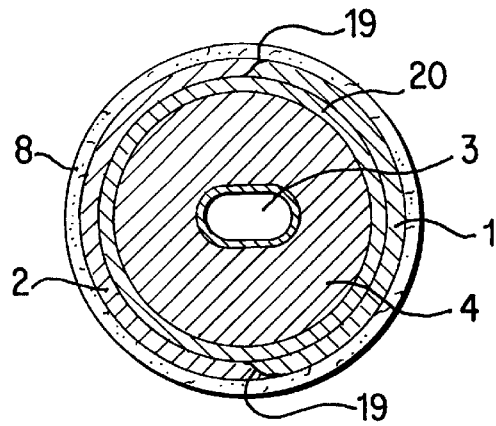
FIG. 3 is a cross-sectional view of the veneered area of the steering wheel rim taken along plane III—III of FIG. 2.

FIG. 3 is a cross-sectional view of the veneered area of the steering wheel rim taken along plane III—III of FIG. 2. The wood veneer is glued with an adhesive layer 20 in a separately pre-molded wood veneer half shell first on one side 1 and then on the opposite side 2 onto a plastic carrier 4 applied to a steel tube ring 3. An abutment 19 is found between veneer covering 1 and veneer covering 2. The plastic carrier 4 consists of SMC-material and is molded in one piece to the steel tube ring 3. During the manufacturing of the steering wheel rim, this plastic carrier 4 is applied to the steel tube ring 3 in a first manufacturing step. The other areas, which adjoin the wood-veneered areas of the steering wheel rim, consist of a plastic foam 5 which is applied to the steel tube ring and which is firmly coated on the outside with a soft covering 6, such as leather. The application of the plastic foam 5 and the leather covering 6 takes place in a step subsequent to the manufacturing of the wood-veneered area. The leather covering 6 ends circumferentially in each case in a surrounding groove 7 between the plastic carrier 4 and the plastic foam 5.

On the outside, the wood veneer of the half shells 1, 2 is covered by a polyester varnish layer 8. The varnish layer may also preferably comprise polyurethane. The structure of the varnish layer consists of an insulation, and optionally of a patination and an adjoining second insulation base. The polyester or polyurethane varnish has closed pores and a high gloss.

Figure 4:
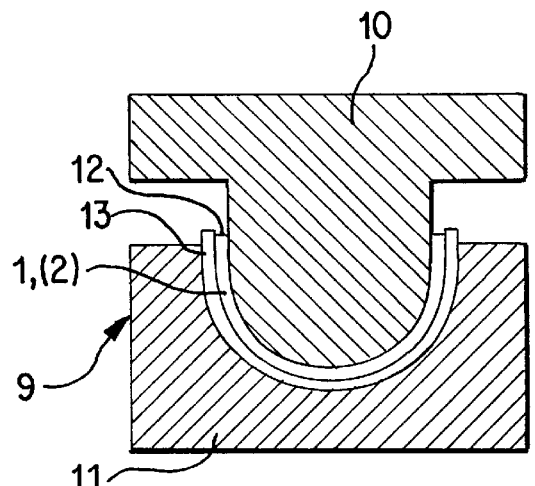
FIG. 4 is a cross-sectional view of a molding tool for pre-molding the veneer according to the process of the present invention.

Before applying the wood veneer as a half shells 1 and 2 to the plastic carrier material 4 of the steering wheel rim, the wood veneer is pre-molded in a molding tool, illustrated in FIG. 4.

In the case of a steering wheel, the molding takes place by cutting curved strips out of a piece of flat fine wood veneer sheets of a thickness of approximately 0.2 to 0.6 mm, the width of the curved strips being larger than half the cross-sectional circumference of the steering wheel rim. The veneer blanks are then softened and made pliable by watering for at least one hour. The softened veneer blanks are then press-dried in a heatable molding tool having an upper die 10 and a lower die 11, which, except for the thickness of the veneer, corresponds in a negative or mating manner, and the blanks are molded into a dimensionally stable shaped veneer part in the form of a curved and groove-shaped half shell 1 and 2. In this case, the edge of the groove-shaped half shell 1 or 2, which projects out of the shape-determining engraving of the molding tool 9, form a projection 12 which is curled in an undefined manner. A protective coating 13 is provided between the bottom die 11 and the wood veneer half shell 1 or 2.

The veneering of the wood-veneered areas of the steering wheel rim takes place in two stages, wherein each stage comprises two steps. In the first stage, the area on the top and bottom on the steering wheel rim when the steering wheel is facing straight ahead, is finish-veneered first on one axial side of the steering wheel rim and in the second stage is finish-veneered on the axially opposite side. In preferred embodiments, the veneering of the top and bottom of one axial side of the steering wheel is carried out simultaneously.

Figure 5:
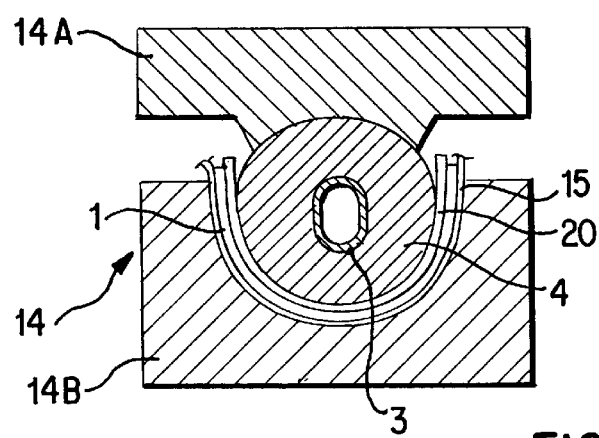
FIG. 5 is a cross-sectional view of a veneering tool, schematically showing the application of a pre-molded veneer shell to one side of the steering wheel rim according to the process of the present invention.
Figure 7:
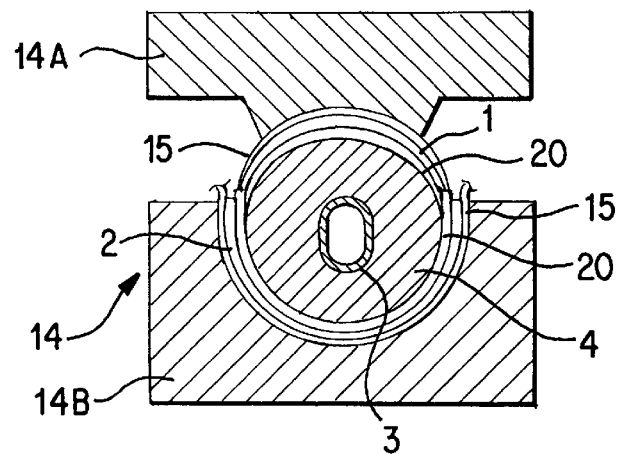
FIG. 7 is a cross-sectional view of a veneering tool, schematically showing the application of a pre-molded veneer shell to the other side of the steering wheel rim according to the process of the present invention.

During the first step in each individual veneering stage, the wood veneer half shells 1, 2 are glued with a bonding agent to the respective sides of the corresponding steering wheel rim areas. In this case, the corresponding wood veneer half shell 1 or 2 is pressed with a veneering tool 14 having relatively movable veneering tool parts 14A, 14B, during the setting time of the bonding agent axially against the steering wheel rim as illustrated in FIGS. 5 and 7.

Figure 6:
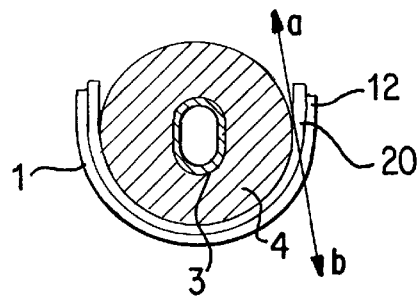
FIG. 6 is a cross-sectional view of the steering wheel rim with one side veneered, schematically showing the trimming of the curled ends along line a-b according to the process of the present invention.
Figure 8:
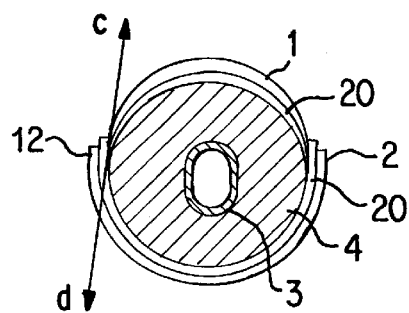
FIG. 8 is a cross-sectional view of the steering wheel rim with both sides veneered, schematically showing the trimming of the curled ends along line c-d according to the process of the present invention.

In the second step of each individual veneering stage, the projections 12 of the wood veneer half shells 1 and 2, which are curled in an undefined manner, are trimmed by milling or grinding along an intersecting line which extends tangentially with respect to the cross-section of the steering wheel rim and is aligned approximately axially with respect to the steering wheel rim along the lines a–b and c–d shown in FIGS. 6 and 8.

After the two-sided veneering of the wood veneer areas of the steering wheel rim, the exterior surfaces of the wood veneer half shells are ground into shape, are varnished and the surface is finished.

Finally, the circumferential ends 21 depicted in FIG. 2, of the wood veneer half shells 1, 2 are trimmed with a fine end milling cutter which is guided by a numerically controlled machine. This completes the veneer assembly, which is then followed by the above noted application of the plastic foam 5 and soft covering 6.

In order to protect the veneer, the wood veneer half shell part 1, 2 situated in the veneering tool 14 is covered with a removable foil 15 which may coincide with the protective covering 13.

Crack-sensitive veneers may be laminated before molding, preferably already before cutting the veneer into shape, with a stabilizing back coating, preferably with a textile material, for example, with fleece or a non-woven fabric.

The wood veneer is press-dried in the molding tool 9 at a temperature of approximately 120° C. and is carried out for a time period of approximately 2 to 8 minutes.

In the first stage, in which the veneer is applied, the wood veneer half shells 1, 2 are preferably applied to the lower part of the steering wheel rim on the side facing away from the driver.

The wood veneer half shells 1, 2 are glued to the plastic carrier 4 of the steering wheel rim with a moisture-reactive bonding agent, which foams or expands slightly during setting. In this case, the wood veneer half shells 1, 2 are brought together with the bonding agent in a still slightly moist condition, which, as a result of the foaming or expanding of the bonding agent, fills in any possible hollow spaces formed between the basic body of the steering wheel rim and the respective wood veneer half shell 1, 2.

Instead of fine wood, cork may also be applied as a veneer according to the process of the present invention.

As the material of the plastic carrier 4 on the steering wheel rim under the wood veneer half shells 1, 2, an SMC plastic is preferably used which has a coefficient of thermal expansion of $15 \times 10^{-6}$. With respect to the magnitude, this value for the thermal expansion coefficient corresponds to that of steel and therefore matches the steel tube ring 3 of the steering wheel rim.

A special advantage of the present invention is the fact that the plastic carrier 4 is an accurately measured part, to which the wood veneer half shells 1, 2, which are also accurately pre-molded, can be applied efficiently with strong tools.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for making a steering wheel for vehicles with a covering made of a natural product on a plastic casing supported by a skeleton tube, wherein the steering wheel has a steering wheel rim partially covered on the top and the bottom segment of the steering wheel, when the steering wheel is facing straight forward, with a covering made of wood or cork veneer with a varnish coating, wherein in between the top and bottom segments, on either side of the steering wheel when the steering wheel is facing straight forward, are segments covered with a soft covering, wherein a circumferential groove, which extends along the cross-sectional plane of the steering wheel rim, is arranged in the transition area between the wood- or cork-veneered segments and the soft covering segments, for receiving the end of the soft covering, and wherein the process for veneering the wood- or cork-veneered segments with veneer comprises the steps of:

cutting curved strips corresponding to the wood- or cork-veneered segments out of a flat sheet of fine wood or cork veneer, the width of each of the curved strips being larger than 180 degrees of the cross-sectional circumference of the steering wheel rim, wherein upon a application to the steering wheel the curved strips mate together in an overlapping manner;

watering the veneer strips for at least one hour to soften them and make them pliable;

press-drying the softened veneer blanks in a heatable molding tool having an upper and a lower die, which, except for the veneer thickness, correspond in a negative or mating manner, and molding the blanks into a dimensionally stable shaped veneer part in the form of a curved and groove-shaped half shell, wherein the edge of the groove-shaped half shell, which projects out of the shape-determining engraving of the molding tool, forms a projection which is curled in an undefined manner, wherein the veneering of the wood- or cork-veneered segments takes place in two stages, each stage having two steps, wherein the first stage comprises finish-veneering one axial side of the steering wheel rim and the second stage comprises finish-veneering the axially opposite side, wherein the first step of each stage comprises gluing a shaped veneer part with a bonding agent on the respective side and pressing the shaped veneer part with a veneering tool axially against the steering wheel rim during setting time, and the second step of each stage comprises trimming the projections of the shaped veneer parts, which are curled in an undefined manner, by milling or grinding along an intersecting line extending tangentially with respect to the cross-section of the steering wheel rim and aligned approximately axially with respect to the steering wheel rim;

subsequently after the two-sided veneering of the segments, grinding the segments to fit, polishing, varnishing and finishing the surface; and trimming the circumferential ends of the shaped veneer parts with a fine end-milling cutter guided in space by a numerically controlled machine.

2. The process according to claim 1, comprising the steps of first encasing a no-spoke skeleton tube ring only in the areas to be veneered, with a plastic setting material corresponding to the desired steering wheel rim thickness minus the veneer thickness to be applied, veneering the encased segments, finishing the veneer, welding a spoke skeleton which is connected to an impact plate skeleton to the areas of the steering wheel rim that are not yet encased, encasing the areas of the steering wheel rim that are not yet encased with a rigid expanded plastic foam coating, wherein the thickness of the foam coating corresponds to the desired steering wheel rim thickness and spoke thickness minus the thickness of a leather covering to be applied, and covering the foam coating with a leather covering.

3. The process according to claim 1, wherein crack-resistant veneers are laminated, before molding, with a stabilizing back coating.

4. The process according to claim 1, wherein the veneer sheets have a thickness of from 0.2 to 0.6 mm.

5. The process according to claim 1, wherein the press-drying takes place in a molding tool at approximate 120° C.

6. The process according to claim 1, wherein the press-drying takes place during a pressing period of approximately 2 to 8 minutes.

7. The process according to claim 1, wherein the segments of the steering wheel rim to be veneered are first veneered on the lower part of the steering wheel rim on the side facing away from the driver.

8. The process according to claim 1, wherein the shaped veneer parts, which are still slightly moist from the watering step, are glued onto the segments to be veneered with a moisture-reactive bonding agent which foams or expands slightly during the setting such that any possible hollow spaces formed between the steering wheel rim and the shaped veneer part are filled by the foaming or expanding reaction of the bonding agent.

9. The process according to claim 1, comprising the steps of varnishing the veneered segments with a polyester or polyurethane varnish wherein the varnish has a layered structure comprising an insulation and optionally a patination and an adjoining second insulating base, forming the basis for a closed-pored high-gloss varnish.

10. The process according to claim 1, wherein the soft covering is leather.

11. The process according to claim 1, wherein the steering wheel is finish-veneered on the top and bottom of each side simultaneously.

12. The process according to claim 1, wherein the steering wheel is entirely covered with the veneer covering.

13. The process according to claim 2, wherein the plastic setting material is a polyester.

14. The process according to claim 2, wherein the rigid expanded plastic foam coating is a polyurethane foam coating.

15. The process according to claim 3, wherein the crack-resistant veneers are laminated, before molding and cutting into shape.

16. The process according to claim 3, wherein the stabilizing back coating is a textile material.

17. The process according to claim 3, wherein the stabilizing back coating is fleece or a non-woven material.

18. A process for applying a covering made of a natural product on an object supported by a skeleton tube encased in plastic, wherein the object is covered in segments with a covering made of wood or cork veneer with a varnish coating, wherein, in between the veneered segments, are segments covered with a soft covering, wherein a circumferential groove, which extends along the cross-sectional plane of the steering wheel rim, is arranged in the transition area between the wood or cork veneered segments and the soft covering segments for receiving the end of the soft covering, and wherein the process for veneering the wood or cork veneered segments with veneer comprises the steps of:

cutting strips corresponding to the wood or cork veneered segments out of a flat sheet of fine wood or cork veneer, the width of each of the curved strips being larger than 180 degrees of the cross-sectional circumference of the object, wherein upon application to the object the curved strips mate together in an overlapping manner;

softening the veneer strips for at least one hour to soften them and make them pliable;

press-drying the softened veneer strips in a heatable molding tool and molding the strips into a dimensionally stable shaped veneer part in the form of a half shell, wherein the edge of the groove-shaped half shell, which projects out of the shape-determining engraving of the molding tool, forms a projection which is curled in an undefined manner;

finish-veneering one side of the object by gluing a shaped veneer part with a bonding agent on one respective side of the object and pressing the shaped veneer part with a veneering tool against the object during the setting time, and then trimming the projections of the shaped veneer parts, which are curled in an undefined manner, by milling or grinding along an intersecting line extending tangentially with respect to the cross-section of the object;

finish-veneering the opposite side of the object by gluing a shaped veneer part with a bonding agent on the respective side of the object and pressing the shaped veneer part with a veneering tool against the object during the setting time, and then trimming the projections of the shaped veneer parts, which are curled in an undefined manner, by milling or grinding along an intersecting line extending tangentially with respect to the cross-section of the object;

grinding the segments to fit, polishing, varnishing and finishing the surface; and trimming the circumferential ends of the shaped veneer parts with a fine end-milling cutter guided in space by a numerically controlled machine.

19. A process of making a vehicle steering wheel comprising:

providing a steering wheel skeleton tube ring with segments encased in plastic;

applying wood veneer to sections of the encased tube ring, wherein said applying wood veneer comprises the following sequential steps:

cutting two strips of wood veneer which have a width slightly more than 180 degrees of the circumference of the tube ring, wherein upon application to the tube ring the two strips of wood mate in an overlapping manner;

wetting the first veneer strip and pre-molding same in a molding tool to a shape corresponding to half the cross-sectional circumference of the tube ring, wherein the ends of the veneer strips which project out of the molding tool form a projection which is curled in an undefined manner;

adhering the first strip to one axial side of the tube ring;

trimming the projecting ends of veneer;

wetting the second veneer strip and pre-molding same in a molding tool to a shape corresponding to half the cross-sectional circumference of the tube ring, wherein the ends of the veneer strips which project out of the molding tool form a projection which is curled in an undefined manner;

adhering the second strip to the opposite axial side of the tube ring; and trimming the projecting ends of veneer.

20. The process according to claim 19, comprising the steps of grinding the veneer to fit and then polishing, varnishing and finishing the surface.

21. The process according to claim 19, comprising the step of trimming the circumferential ends of the veneer.

* * * * *